Sept. 22, 1936.   D. J. McNEIL   2,055,258
FRICTION CLUTCH OPERATING MECHANISM
Filed March 17, 1934
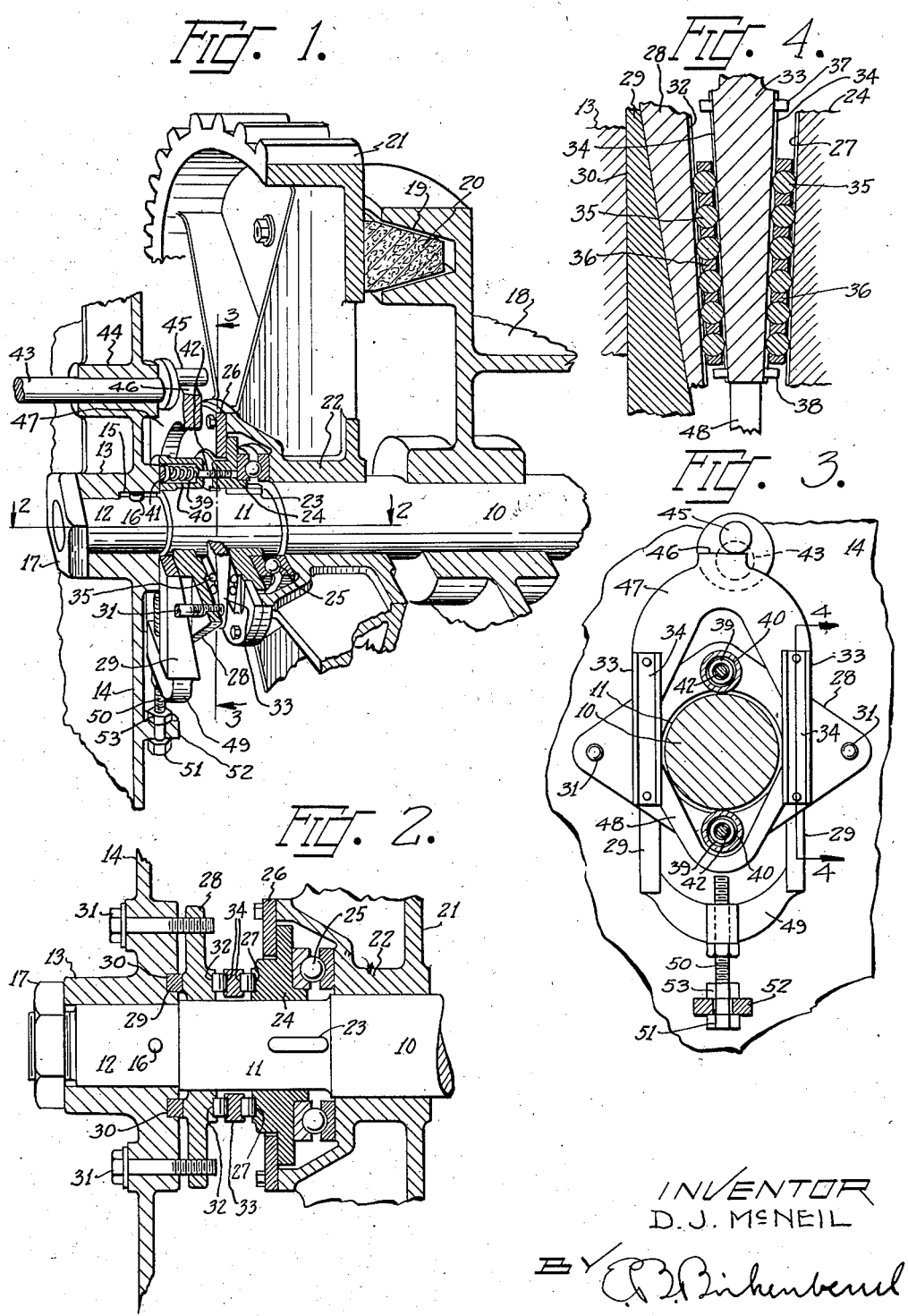
INVENTOR
D. J. McNEIL
BY
ATTORNEY Patented Sept. 22, 1936

2,055,258

UNITED STATES PATENT OFFICE 2,055,258

FRICTION CLUTCH OPERATING MECHANISM

Donald J. McNeil, Portland, Oreg., assignor to Willamette-Hyster Company, Portland, Oreg.

Application March 17, 1934, Serial No. 716,113

1 Claim. (Cl. 74—110)

This invention relates generally to power transmitting devices, and particularly to a friction clutch operating mechanism.

The main object of this invention is to provide a unique form of thrust mechanism whereby a man's capacity to operate a mechanism for applying frictions is increased, thereby making it possible to successfully employ a manually applied friction mechanism under conditions which would not otherwise be practical.

These, and other objects, will become more apparent from the specification following as illustrated in the accompanying drawing, in which:

Fig. 1 is a perspective view of the device showing parts broken away in section.

Fig. 2 is a section taken along the line 2—2 in Fig. 1.

Fig. 3 is a section taken along the line 3—3 in Fig. 1.

Fig. 4 is a section taken along the line 4—4 in Fig. 3.

Similar numbers of reference refer to similar parts throughout the several views.

Referring in detail to the drawing, there is shown a stationary shaft 10 having a reduced friction supporting section 11 and a still further reduced end section 12 which is supported by the bearing 13 of the side frame 14. The bearing 13 is provided with a key slot 15 which receives the pin 16 projecting from the shaft section 12. A nut 17 on the end of the section 12 holds the shaft 10 against endwise movement, and the pin 16 holds it against rotary movement.

Rotatably mounted on the shaft 10 is a cable winding drum 18 or other element provided with an annular V groove 19 which receives the friction blocks 20 made fast on the side of the drive gear 21 whose hub 22 is also rotatable on the shaft 10. The gear 21 meshes with a suitable drive gear (not shown).

The section 11 of the shaft 10 has secured thereon by means of a key 23 a collar 24 between which and the hub 22 is placed the end thrust bearing 25. The collar 24 is held in relation to the hub 22 by means of a ring 26. The collar 24 is provided with a pair of parallel channels 27.

Opposite the collar 24 and spaced therefrom is a thrust plate 28 which is separated from the bearing 13 by the wedges 29 which occupy channels 30 in the bearing 13. The thrust plate 28 is clamped against the wedges 29 by means of the screws 31. The thrust plate 28 is also provided with channels 32 which are in alignment with the channels 27.

Between the collar 24 and the thrust plate 28 are placed the wedges 33 which have their inclined surfaces provided with channels 34 which correspond with the channels 27 and 32. The wedges 33 are separated from the collar 24 and the thrust plate 28 by means of the rollers 35, which are held in their proper relationship by means of the cage bars 36. The wedges 33 are provided with stop pins 37 and 38 at their upper and lower ends to prevent the improper positioning of the wedge 33 with relation to the rollers 35.

The friction blocks 20 are normally held out of engagement with the groove 19 by means of the springs 39 which occupy recesses 40 in the thrust plate 28 and re-act between the heads 41 of the bolts 42, which are threaded into the collar 24 and pass through the bottom of the recess 40.

The device is operated by means of a shaft 43 which journals in the bearing 44 in the side frame 14. The shaft 43 carries on its inner end an eccentric pin 45 which bears against the face 46 of a yoke 47 which unites the wedges 33. The lower ends of the wedges 33 are united by a yoke 48. The wedges 29 are united by a yoke 49 through which is threaded a bolt 50 whose head 51 is held against the lug 52 on the side frame 14 by the nut 53.

It can be seen from the foregoing that a rocking motion supplied by the operator to the shaft 43 will be transferred by the crank pin 45 to the yoke 47 and through it to two wedges 33 which through the rollers 35 transmit the thrust to the collar 24 of the roller bearing 25, by means of which the gear 21 and its friction blocks 20 are moved laterally with relation to the drum groove 19 or longitudinally along the shaft 10, in a manner to force the friction blocks 20 into the groove 19, there being only a negligible amount of the force applied expended in overcoming friction within the device itself. The bars are also simple to construct and not easily rendered inoperative, and do not require extreme precision in their manufacture.

I claim:

A mechanical movement for effecting axial movement of a rotatable part on a stationary shaft consisting of a shaft, a bearing for supporting said shaft and adapted to hold same against endwise rotary movement, a thrust plate spaced from said bearing and surrounding said shaft, a pair of wedges disposed between said thrust plate and bearing, a collar splined on said shaft, a pair of channeled wedges disposed on opposite sides of said shaft between said thrust plate and collar, rollers disposed within said channels adapted to engage said thrust plate and collar, a yoke connecting said channeled wedges, means for adjusting and locking said thrust plate, means for actuating said channeled wedges for the purpose of producing a lateral thrust against said collar and springs disposed between said bearing and collar for urging said collar away from said bearing.

DONALD J. McNEIL.